US012202715B2

(12) United States Patent
Masters et al.

(10) Patent No.: US 12,202,715 B2
(45) Date of Patent: Jan. 21, 2025

(54) TELEHANDLER BOOM AUXILIARY CONTROL PANEL

(71) Applicant: Xtreme Manufacturing, LLC, Henderson, NV (US)

(72) Inventors: James Charles Masters, Henderson, NV (US); Andrew Jared Farnsworth, Henderson, NV (US)

(73) Assignee: Xtreme Manufacturing, LLC, Henderson, NV (US)

( * ) Notice: Subject to any disclaimer, the term of this patent is extended or adjusted under 35 U.S.C. 154(b) by 848 days.

(21) Appl. No.: 16/745,030

(22) Filed: Jan. 16, 2020

(65) Prior Publication Data

US 2021/0221663 A1 Jul. 22, 2021

(51) Int. Cl.
*B66F 9/065* (2006.01)
*B66F 9/075* (2006.01)
*B66F 11/04* (2006.01)

(52) U.S. Cl.
CPC .......... *B66F 9/0759* (2013.01); *B66F 9/0655* (2013.01); *B66F 9/07559* (2013.01); *B66F 11/046* (2013.01)

(58) Field of Classification Search
CPC .. B66F 9/0665; B66F 9/07559; B66F 9/0759; B66F 11/046
See application file for complete search history.

(56) References Cited

U.S. PATENT DOCUMENTS 2,986,295 A * 5/1961 Shaffer ............... B66F 9/07559 280/755
3,056,867 A 10/1962 Eitel
3,631,939 A 1/1972 Johnson et al.
3,642,096 A 2/1972 Valentine
3,741,337 A 6/1973 Visinsky
3,757,895 A 9/1973 Knutson
3,774,217 A 11/1973 Bonner et al.
(Continued)

FOREIGN PATENT DOCUMENTS

CA 2030202 C 10/1995
CA 2282032 A1 * 8/2000 ............ B66F 11/046
(Continued)

OTHER PUBLICATIONS

Description Translation for FR 3045589 A1 from Espacenet (Year: 2017).*

(Continued)

*Primary Examiner* — Jason D Shanske
*Assistant Examiner* — Daniel M. Keck
(74) *Attorney, Agent, or Firm* — Armstrong Teasdale LLP

(57) ABSTRACT

A telehandler vehicle includes a self-propelled chassis including a frame supporting an operator cab. The operator cab includes a first boom control panel and a propulsion system configured to control a movement and a position of the frame. The telehandler vehicle also includes a boom pivotably coupled to the frame, a material handling implement coupled to a distal end of the boom, and a personnel platform coupled to the distal end of the boom. The personnel platform has a forward end in a direction of travel and an aft end opposite the forward end. The telehandler vehicle further includes a second boom control panel coupled to the forward end of the personnel platform.

17 Claims, 8 Drawing Sheets

(56) References Cited

U.S. PATENT DOCUMENTS 3,963,095 A 6/1976 Hedges
4,049,079 A 9/1977 Stedman
4,089,388 A 5/1978 Johnson
4,160,492 A 7/1979 Johnston
4,287,966 A 9/1981 Frees
4,331,215 A 5/1982 Grove et al.
4,334,594 A 6/1982 Jost
4,676,339 A 6/1987 Rybka et al.
4,721,213 A 1/1988 Eitel
4,755,100 A 7/1988 Schultz et al.
4,979,588 A * 12/1990 Pike ...................... B66F 17/006 182/2.11
5,196,998 A 3/1993 Fulton
5,286,159 A * 2/1994 Honma ................. B66F 11/046 182/2.11
6,330,933 B1 * 12/2001 Boeckman ............ B66F 11/042 182/63.1
6,405,114 B1 6/2002 Priestley et al.
6,810,993 B2 11/2004 Promersberger et al.
8,490,746 B2 * 7/2013 Cummings ........... B66F 17/006 182/2.1
8,944,217 B2 2/2015 Anasis et al.
9,079,756 B2 7/2015 Beji
9,382,099 B2 7/2016 Aquino et al.
9,550,475 B1 * 1/2017 Walker .................... B66C 23/78
9,567,193 B2 2/2017 Schmid et al.
9,663,333 B2 5/2017 Sennebogen
10,611,347 B1 4/2020 Archer et al.
10,919,748 B2 2/2021 Calomino et al.
11,117,790 B2 9/2021 Keller
11,130,663 B2 9/2021 Linsmeier et al.
2002/0175319 A1 11/2002 Green et al.
2004/0085184 A1 5/2004 Sigmund
2004/0174030 A1 9/2004 Sentenne
2006/0101782 A1 5/2006 Sanders
2007/0104563 A1 5/2007 Hamm
2009/0008175 A1 1/2009 Donaldson
2009/0071751 A1 3/2009 Schmidt et al.
2009/0145871 A1 6/2009 Bond
2012/0091227 A1 4/2012 Bisson et al.
2012/0217091 A1 * 8/2012 Baillargeon ........... G08B 21/02 182/18
2013/0338815 A1 * 12/2013 Ogawa ................. G05B 19/409 700/180
2015/0027808 A1 1/2015 Baillargeon et al.
2015/0225216 A1 8/2015 Koyama
2016/0099122 A1 4/2016 Cummings et al.
2017/0211765 A1 7/2017 Walker
2017/0267508 A1 9/2017 Huber et al.
2017/0291801 A1 10/2017 Mellott et al.
2017/0291802 A1 10/2017 Hao et al.
2018/0050893 A1 2/2018 Jeffries
2018/0057333 A1 3/2018 Gale et al.
2018/0195589 A1 7/2018 Mark
2019/0210854 A1 7/2019 Eck et al.
2019/0225471 A1 7/2019 Luminet et al.
2019/0233270 A1 8/2019 Dittus
2019/0242094 A1 8/2019 Bolz et al.
2019/0300346 A1 10/2019 Iotti
2019/0300349 A1 10/2019 Iotti
2020/0039802 A1 2/2020 Keller
2020/0317489 A1 10/2020 Bhatia et al.
2021/0078844 A1 3/2021 Hubert
2021/0154833 A1 * 5/2021 Peters ....................... B66F 9/24
2021/0276848 A1 * 9/2021 Miller ..................... B60L 50/66
2021/0285467 A1 9/2021 Wenker
2022/0227611 A1 * 7/2022 Cadou ..................... B66F 9/065
2022/0229523 A1 * 7/2022 Kobel ................... B66F 17/006
2022/0332556 A1 * 10/2022 Kobel ................... B66F 11/044
2023/0264937 A1 * 8/2023 Hoover ................. B66F 17/006 182/2.3

FOREIGN PATENT DOCUMENTS

CN 209602039 U 11/2019
CN 111362204 A * 7/2020
EP 1026120 A2 9/2000
EP 2985256 A1 2/2016
EP 3392192 A1 10/2018
EP 3418249 A1 12/2018
FR 3045589 A1 * 6/2017 ............... B60Q 1/24
JP 2017095093 A 6/2017
JP 6189512 B1 * 8/2017 ........... B66F 11/046
KR 20180034866 A * 4/2018
WO WO-9800618 A1 * 1/1998 ........... B66F 11/044
WO 2012091227 A1 7/2012
WO 2017140917 A1 8/2017
WO WO-2023052697 A1 * 4/2023 ........... B66F 9/0655

OTHER PUBLICATIONS

Extended European search report issued for Application No. EP 20214029.9, dated Jun. 18, 2021 (8 pgs).

Product information—"Skyman series", Dec. 22, 2018, Retrieved from the Internet: URL: https://web.archive.org/web/20181222191436/http://www.dasancrane.com/contents/prod020201.php.

Extended European search report, dated Jun. 18, 2021 for European patent application No. EP 20214029.9 (8 pgs).

* cited by examiner

TELEHANDLER BOOM AUXILIARY CONTROL PANEL

FIELD

The field of the disclosure relates generally to construction equipment, and more particularly self-propelled construction equipment including a boom and material handling implement positioned at a distal end of the boom.

BACKGROUND

Telehandlers are a type of mobile vehicle used to move a payload between the ground and an elevated position or between ground-level positions. Telehandlers include a telescoping boom, on the end of which is connected an implement, such as a pair of forks. Conventionally, the boom of a telehandler pivots about a horizontal axis located near the rear or base end of the telehandler. Such arrangements provide a limited ability to lift material over and beyond an obstacle. For example, a conventional telehandler has a limited ability to place material inside of an upper floor of a structure. Rather, conventional telehandlers are limited to placing the material near an external surface of the structure. Improvements to telehandler booms provide articulated segments that permit the boom more flexible operation.

At least some known telehandlers include a propulsion system configured to drive at least one wheel of the telehandler and a steerage system. The propulsion system and steerage system may be controlled from a first control console positioned in an operator's cab located on the telehandler. The first control console also includes control input devices for controlling an operation of the boom and attached implement. From the cab, a boom operator has difficulty observing desired landing points for the material being carried by the boom implement. In such cases a second spotter is used to monitor the position of the implement and load and signal appropriate command hand signals to the operator in the cab. Such communications are error-prone and labor intensive.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION

In one aspect, a telehandler vehicle includes a self-propelled chassis including a frame supporting an operator cab, the operator cab including a first boom control panel and a propulsion system configured to control a movement and a position of the frame. The telehandler vehicle also includes a boom pivotably coupled to the frame, a material handling implement coupled to a distal end of the boom, and a personnel platform coupled to the distal end of the boom. The personnel platform has a forward end in a direction of travel and an aft end opposite the forward end. The telehandler vehicle further includes a second boom control panel coupled to the forward end of the personnel platform.

In another aspect, a telehandler vehicle includes a chassis that includes a forward end, an aft end opposite the forward end, a frame extending therebetween, and at least one powered drive wheel. The telehandler vehicle also includes an operator cab mounted on the chassis, a boom assembly having at least one boom section pivotally coupled to the chassis, and a material handling implement couplable to a distal end of the at least one boom section. The telehandler vehicle further includes a first boom control panel positioned in the operator cab that includes a first plurality of manual input devices responsive to an operator manning the operator cab for receiving boom motion commands for causing the boom assembly to move in a desired direction. The telehandler vehicle further includes a personnel platform mounted adjacent the material handling implement and a second boom control panel positioned on the personnel platform that includes a second plurality of manual input devices responsive to an operator manning the personnel platform for receiving boom motion commands for causing the boom assembly to move in a desired direction. The telehandler vehicle also includes a lockout circuit interconnecting the first boom control panel and the second boom control panel to prevent motion commands received by the first boom control panel and the second boom control panel from causing the telehandler vehicle to move when the second boom control panel is active.

In yet another aspect, method of operating a construction machine that includes an operator cab having a first boom control panel and a boom having a material implement and personnel platform coupled to a distal end of the boom. The personnel platform includes a second boom control panel. The method includes operating the first boom control panel in the operator cab, the first boom control panel configured to control motion of the boom from the operator cab, transferring control of the boom from the first boom control panel to the second boom control panel, disabling control of the boom from the first boom control panel and operating the boom from the second boom control panel from the personnel platform.

DETAILED DESCRIPTION

A telehandler having a personnel platform and material implement positioned on a distal end of the boom and a machinery control system is described herein. Construction machinery, boats, and other vehicles may have more than one mode of operation including a self-propulsive mode of operation. Other modes of operation may be used when the self-propulsive mode is secured at a work site. The different modes of operation may also be associated with different directions of primary attention of the operator of the telehandler. In other words, during the self-propulsive mode of operation, the primary focus of the operator's attention is toward a forward end of the vehicle in the direction of travel. However, after arriving at a site of work activities, secured from the self-propulsive mode of operation and in another mode, for example, a boom operations mode, the primary focus of the operator's attention shifts to, in this example, the boom. As used herein, direction of travel refers to movement toward the forward end of the vehicle, acknowledging that at certain times the vehicle may enter a "reverse" mode of travel for relatively short periods of time.

In the disclosed embodiments, an auxiliary single man boom-only control panel is mounted at the end of the telehandler boom in the personnel platform. The auxiliary single man boom-only control panel permits the operator to manipulate the telehandler boom for extend, lift, and personnel platform functions while the operator is manning the telehandler in the personnel platform. The operator position in the personnel platform at the end of the boom provides for excellent visibility for all loads. The control panel does not include input devices for vehicle drive functions, only the capability to manipulate the load via the boom.

Figure 1:
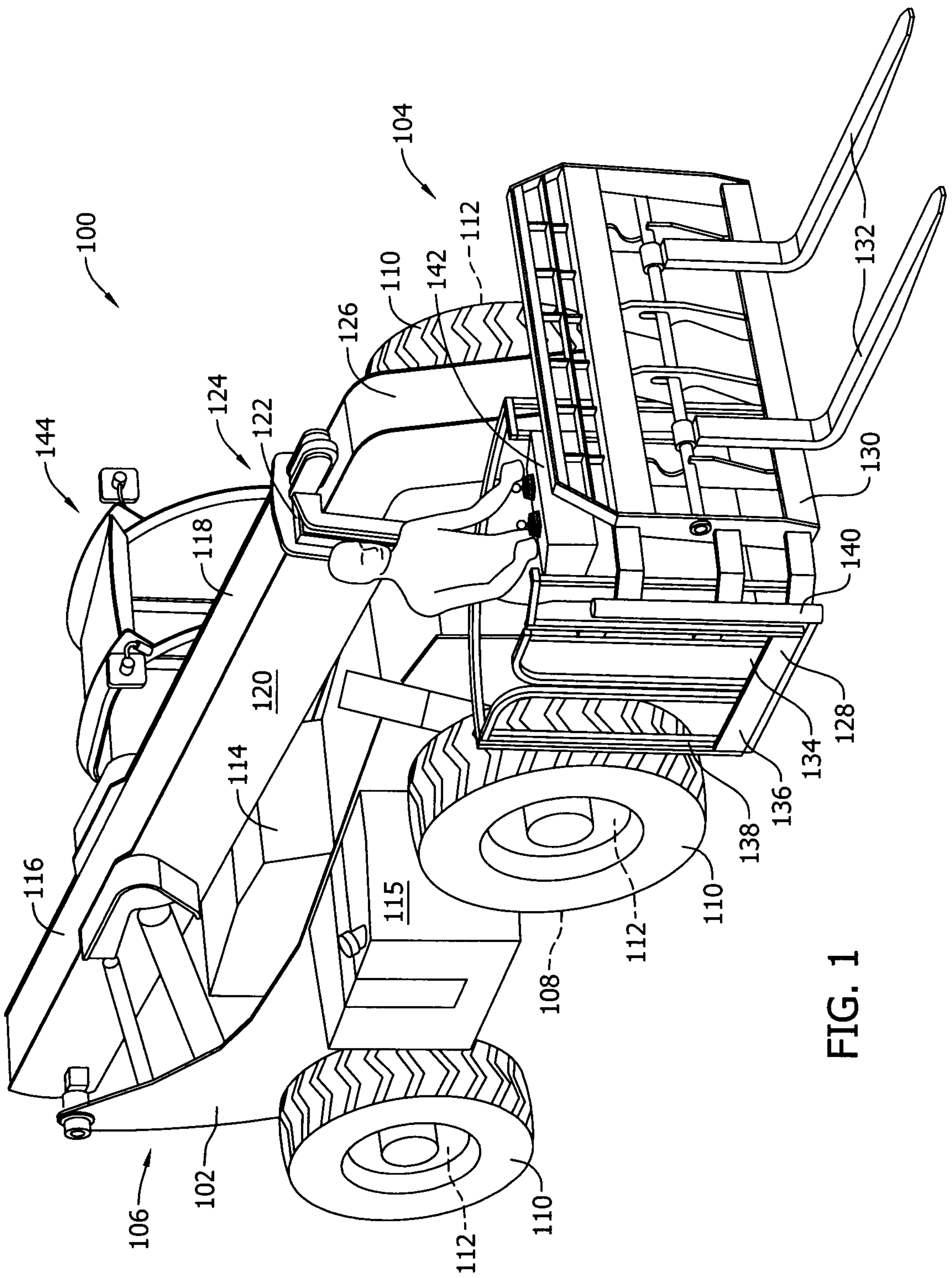
FIG. 1 is a perspective view of a type of construction machine, such as, a telehandler that may be used in construction.
Figure 2:
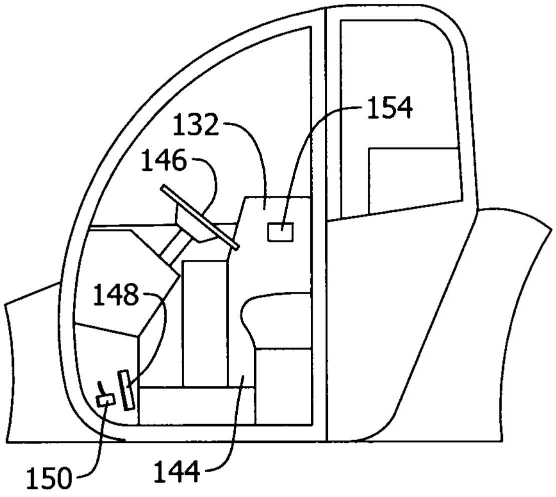
FIG. 2 is a side elevation view of an operator cab that may be used with the construction machine shown in FIG. 1.

FIG. 1 is a perspective view of a type of construction machine 100, such as, a telehandler that may be used in construction. FIG. 2 is a side elevation view of an operator cab 144 that may be used with construction machine 100. In the example embodiment, construction machine 100 includes a frame 102 having a forward end 104, an aft end 106 opposite the forward end 104, a chassis 108 extending therebetween, and at least one powered drive wheel 110. Powered drive wheel 110 may be powered by individual propulsion motors 112 or may be powered from an engine/transmission combination 114. Individual propulsion motors 112 may be hydraulic motors powered from a hydraulic fluid supply system 115. Construction machine 100 further includes a boom 116 having at least one boom section 118 pivotally extending from frame 102. In various embodiments, boom 116 may be a beam boom or an articulated boom, which either may also include a telescoping feature. In one embodiment, boom 116 includes a lower boom section 120 and an upper boom section 122 coupled together at a slidable joint 124. In still another embodiment, boom 116 further includes a jib section 126, which directly connects with a personnel platform 128 and/or a material implement 130. Material implement 130 also includes one or more tines 132 or other material handling device. From personnel platform 128 the operator is able to operate boom 116, but there is no provision for the operator to drive construction machine 100 or operate propulsion motors 112 from personnel platform 128.

Personnel platform 128 includes a walking deck 134 for supporting a user and a kick plate 136. A handrail 138 provides fall protection for the operator, and one or more stanchions 140 are provided that are usable for mounting equipment, such as, a first boom control panel 142.

Operator cab 144 may include propulsive system controls, for example, a steering wheel 146, an accelerator foot pedal 148, a brake 150, and the like. Operator cab 144 may also include a second boom control panel 152 located inside operator cab 144. In various embodiments, second boom control panel 152 includes a first plurality of manual input devices 154 responsive to an operator for receiving boom motion commands for causing boom 116 to move in a desired direction. In other embodiments, second boom control panel 152 is mounted on frame 102 or communicatively coupled to construction machine 100 and accessible to the operator when outside operator cab 144.

Figure 3:
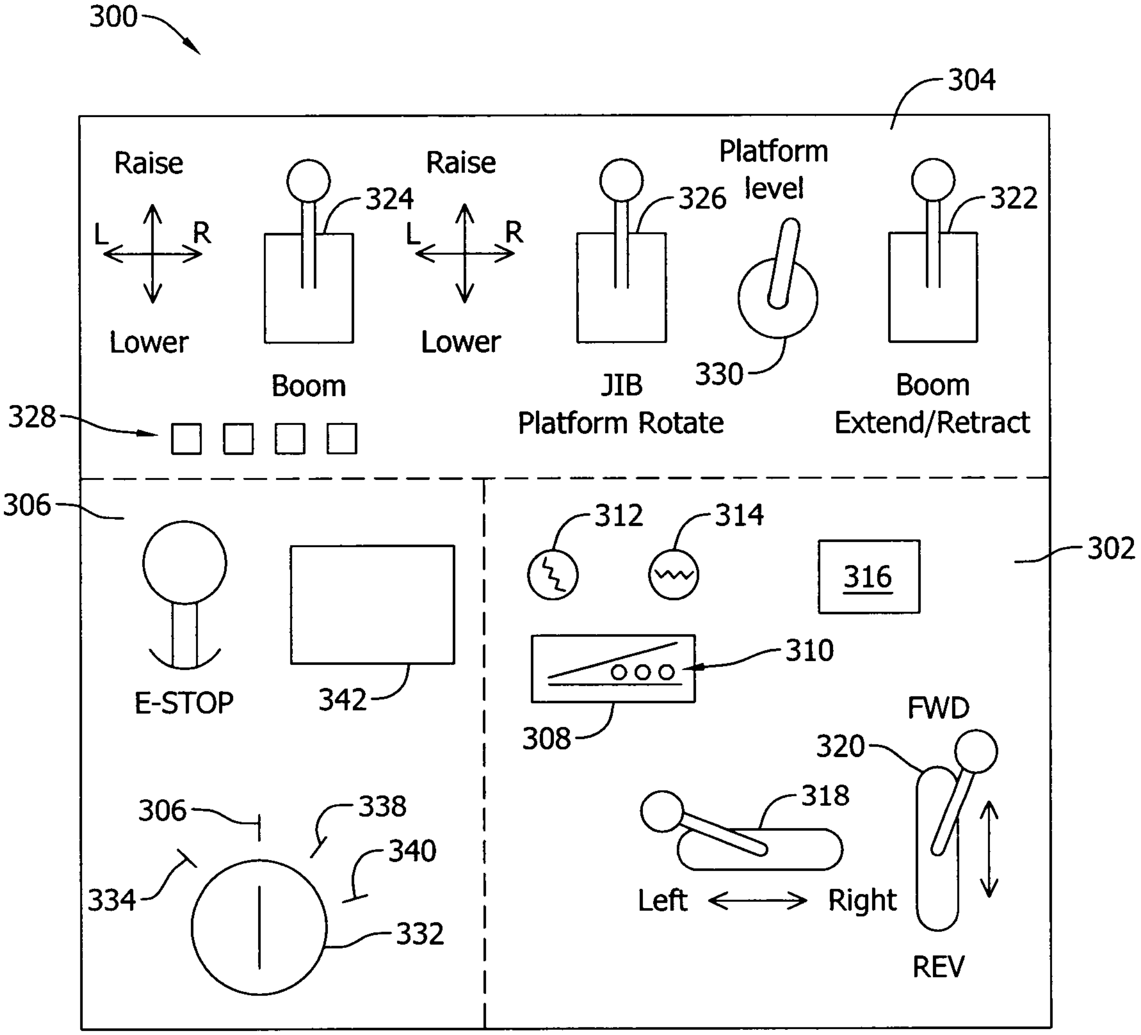
FIG. 3 is a plan view of a control panel, which may be used in the position of second boom control panel.

FIG. 3 is a plan view of a control panel 300, which may be used in the position of second boom control panel 152. In the example embodiment, control panel 300 includes a self-propulsion section 302, a boom section 304, and a lockout section 306.

Self-propulsion section 302 includes, for example, a battery condition indicator 308 having indicator LEDs 310 that light up to indicate the level of charge remaining in the batteries. For example, a lighted green LED indicates an adequate charge level. A lighted yellow LED indicates the need for charging soon. A lighted red LED warns that the battery charge level is low, boom operations should be halted until the batteries are recharged. Self-propulsion section 302 may also include an engine START switch or button 312 and, if necessary, a CHOKE control 314. A cold engine may be started by pressing Engine START button 312 while pressing and holding CHOKE control 314. To start/restart a warm engine, press START button 312 only. A display panel 316 is a lighted text window that displays the present operating status or an existing error condition. Display panel 316 may also include a plurality of soft keys or associated hard keys from which to accept input data. A steerage control 318 and propulsive speed control 320 are used to move construction machine 100 from one job site location to another. In addition to or instead of steering wheel 146, accelerator foot pedal 148, and brake 150, steerage control 318 may be embodied in a joystick, as shown, or in steering wheel 146, a trackball, or the like. Propulsive speed control 320 may be embodied as a joystick, as shown, or in accelerator foot pedal 148 or other control device.

Boom section 304 includes a boom extend/retract control 322, which is used to extend or retract the telescopic feature of boom 116. Boom motion continues until boom 116 extend/retract control 322 is released or until boom 116 reaches a hard stop or a safe travel limit. Operating a LOWER BOOM RAISE or an UPPER BOOM RAISE button or toggle of boom control 324 raises the selected boom. Pressing a LOWER BOOM DOWN or an UPPER BOOM DOWN button lowers the selected boom. The selected motion of boom 116 continues until boom control 324 is released or until each boom 116 reaches a hard stop or a safe travel limit. Operating a JIB control 326 raises jib section 126, if installed or lowers the jib boom when operated in a lower direction. A motion of jib section 126 continues until the control is released or until jib section 126 reaches a hard stop or a safe travel limit. If available, operating a BOOM ROTATION control 324 in a CW (clockwise) or a CCW (counterclockwise) commands a frame 102 that is pivotable to rotate in the direction selected until boom control 324 is released or a travel stop is reached. Boom 116 is capable of rotating through, for example, seven hundred degrees.

A plurality of SPEED buttons 328 may be available along the lower area of boom section 304. If available, one of plurality of SPEED buttons 328 may be selected prior to or simultaneous with selecting a boom function to command the speed at which the boom function should be carried out. In the example embodiment, four speeds are available to control the positioning of the boom lift.

A platform level switch 330 is actuated to level personnel platform 128. In one embodiment, platform level switch 330 levels personnel platform 128 only. In another embodiment, platform level switch 330 levels personnel platform 128 and, if necessary, controls for boom 116 and boom sections 118 and 120, and jib section 126.

Lockout section 306 includes a key switch 332 used to select the active control panel for operating boom 116. Turning key switch 332 to a PLATFORM (WORK CAGE) position 334 selects operation from second boom control panel 152. Turning key switch 332 to a CAB position 336 selects operation from second boom control panel 152. Turning key switch 332 to a PLATFORM (BOOM) position 338 selects operation from first boom control panel 142. A power off position 340 interrupts all electric and hydraulic power operations except emergency lowering. Removing the key protects against operation by unauthorized persons. The key may be removed with key switch 332 in any selected position.

Automatic outrigger extension/retraction may be accomplished using, for example, an outrigger control 342. In an embodiment, outrigger control 342 and a level control 344 may be activated simultaneously or sequentially to automatically deploy outriggers when needed. The outriggers may also be manually extended or retracted. An outrigger indicator notifies the operator when the outriggers are properly deployed and the weight of construction machine 100 is on the outriggers. Each of the outer outrigger indicators indicates load is on the outrigger footpad. Each of the inner outrigger indicators, when flashing, indicates that side is low and needs to be further raised for leveling.

Figure 4:
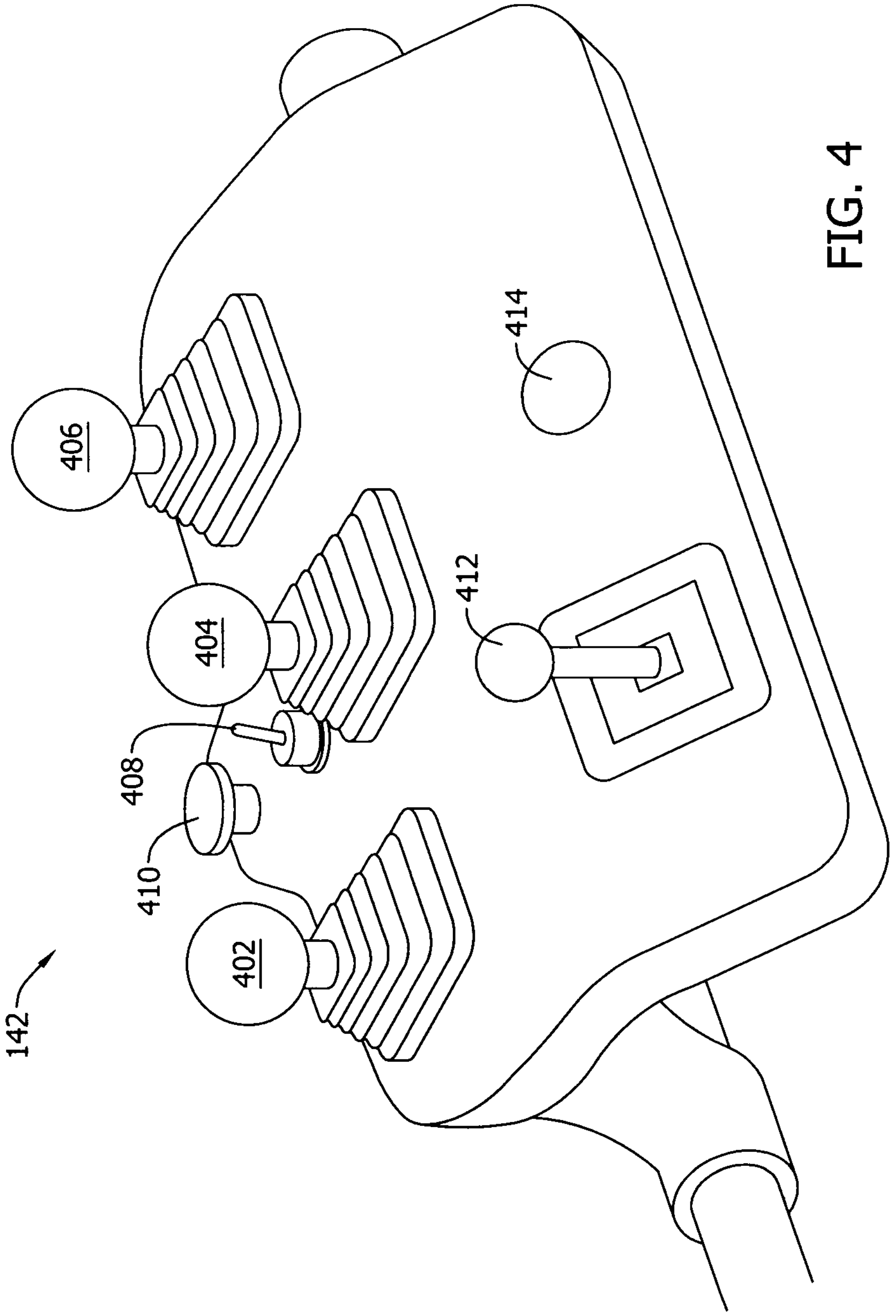
FIG. 4 is a perspective view of another embodiment of first boom control panel, which may be used in personnel platform.

FIG. 4 is a perspective view of another embodiment of first boom control panel 142, which may be used in personnel platform 128. In the example embodiment, first boom control panel 142 includes a boom joystick control 402, a jib/platform rotate joystick control 404, a boom extension joystick control 406, a platform level toggle control 408, and an emergency stop (E-stop) pushbutton 410. In some embodiments, first boom control panel 142 also includes outrigger controls, such as, a deploy/retract joystick 412 for manual or individual deployment or retraction of outriggers 502 and 504. First boom control panel 142 also includes an automatic control 414 that permits all outriggers to be deployed simultaneously.

In the example embodiment, first boom control panel 142 is oriented on personnel platform 128 facing in a same direction as material implement 130. Such an orientation permits an operator to view directly where personnel platform 128 is at all times with respect to obstacles.

Figure 5:
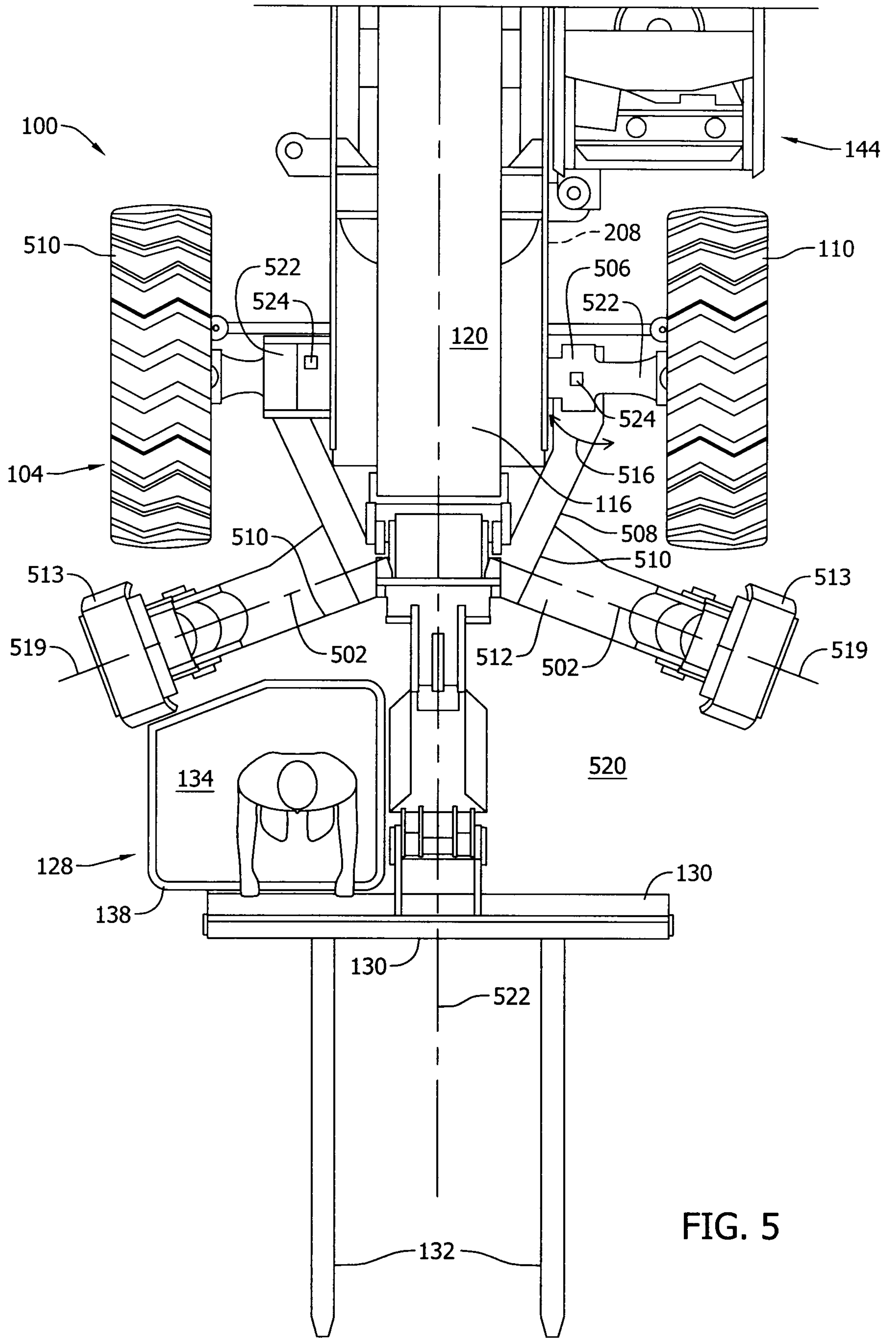
FIG. 5 is a plan view looking down on the forward end of the construction machine shown in FIG. 1.

FIG. 5 is a plan view looking down on forward end 104 of construction machine 100. In the example embodiment, forward end 104 includes a plurality of forward outriggers 502 illustrated in FIG. 5 as being retracted or not deployed. In various embodiments, aft end 106 also includes aft outriggers 504 (not shown in FIG. 5) oriented and configured similarly to forward outriggers 502. In the example embodiment, forward outriggers 502 and aft outriggers 504 are each formed of a shoulder joint 506, a wishbone 508, a lower arm 512 and a landing pad 513. Lower arm 512 has a longitudinal axis 519. In some embodiments, lower arm 512 is rotatable with respect to wishbone 508 to move from extending in an approximate vertical direction to a position with landing pad 513 touching a travel surface 520. In other embodiments, lower arm 512 pivots at or near elbow joint 510 to reposition lower arm 512 from the approximately vertical orientation to the position with landing pad 513 touching travel surface 520. A predetermined amount of pressure is applied to lower arm 512 to stabilize construction machine 100. Each of forward outriggers 502 and aft outriggers 504 may be deployed separately and individually, or all outriggers may be deployed in concert, or any combination thereof. Typically, construction machine 100 has four outriggers, two forward and two aft, but other numbers and positions of out riggers may be used. Outriggers 502 and 504 are formed of an "L" shape to provide clearance for wheels 110 without extending a length of construction machine 100. The shape of outriggers 502 and 504 also provides a longer outrigger base for increased stability. Wishbone 508 is a monolithic brace, which couples forward outriggers 502 to frame 102 and a forward axle 522. A similar configuration for aft outriggers 504 also includes an aft wishbone (not shown). In various embodiments, wishbone 508 is formed of a casting. In other embodiments, wishbone 508 is fabricated.

In operation, to stabilize construction machine 100 at a job site, the operator may deploy forward outriggers 502 and aft outriggers 504. By operating individual actuators or a single master actuator, forward outriggers 502 and aft outriggers 504 may be deployed individually or in-gang. A predetermined amount of force is applied to travel surface 520 to provide an appropriate stabilization to construction machine 100.

Figure 6:
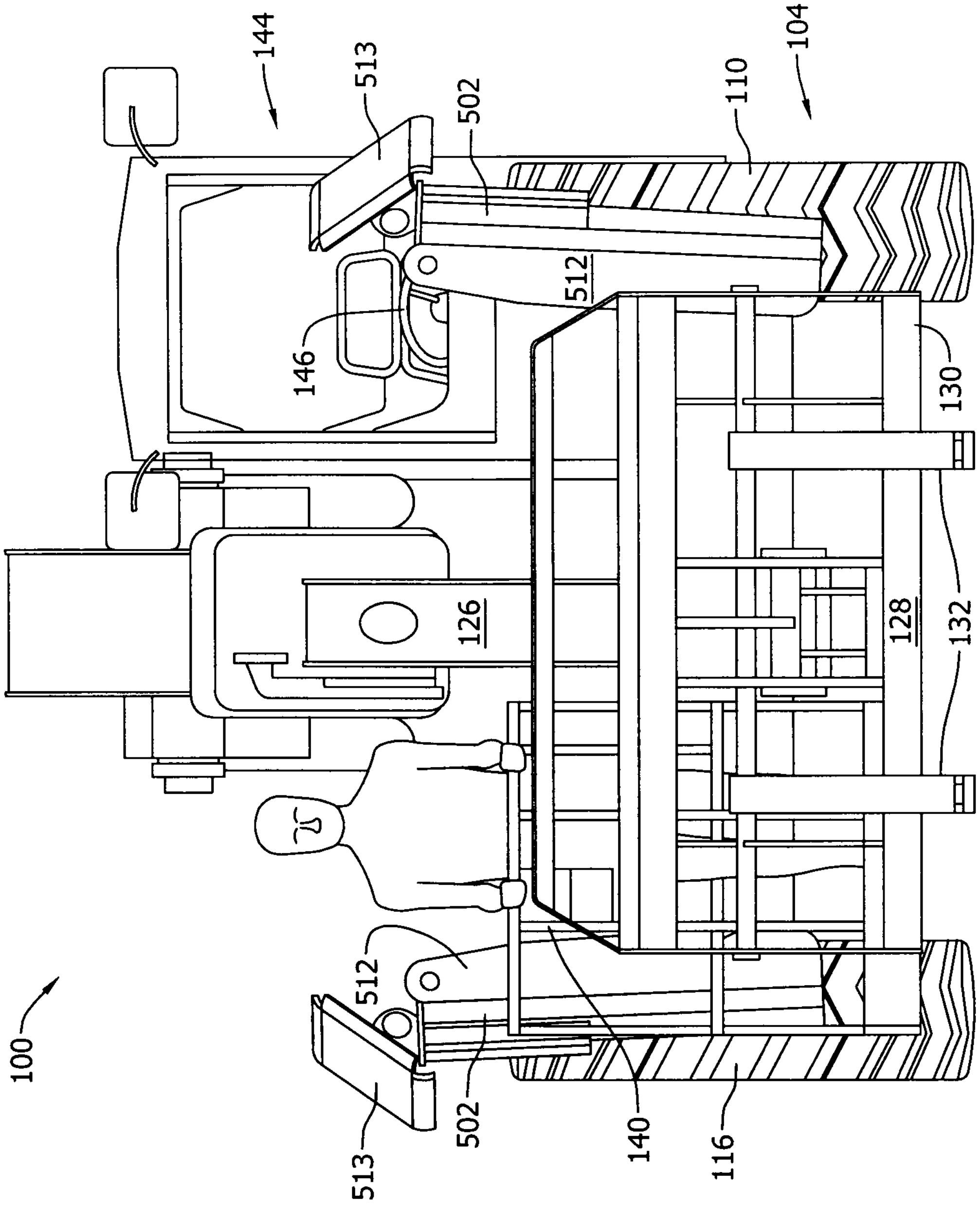
FIG. 6 is a front elevation view of the forward end of the construction machine shown in FIG. 1, with forward outriggers 502 retracted.

FIG. 6 is a front elevation view of forward end 104 of construction machine 100 with forward outriggers 502 retracted.

Figure 7:
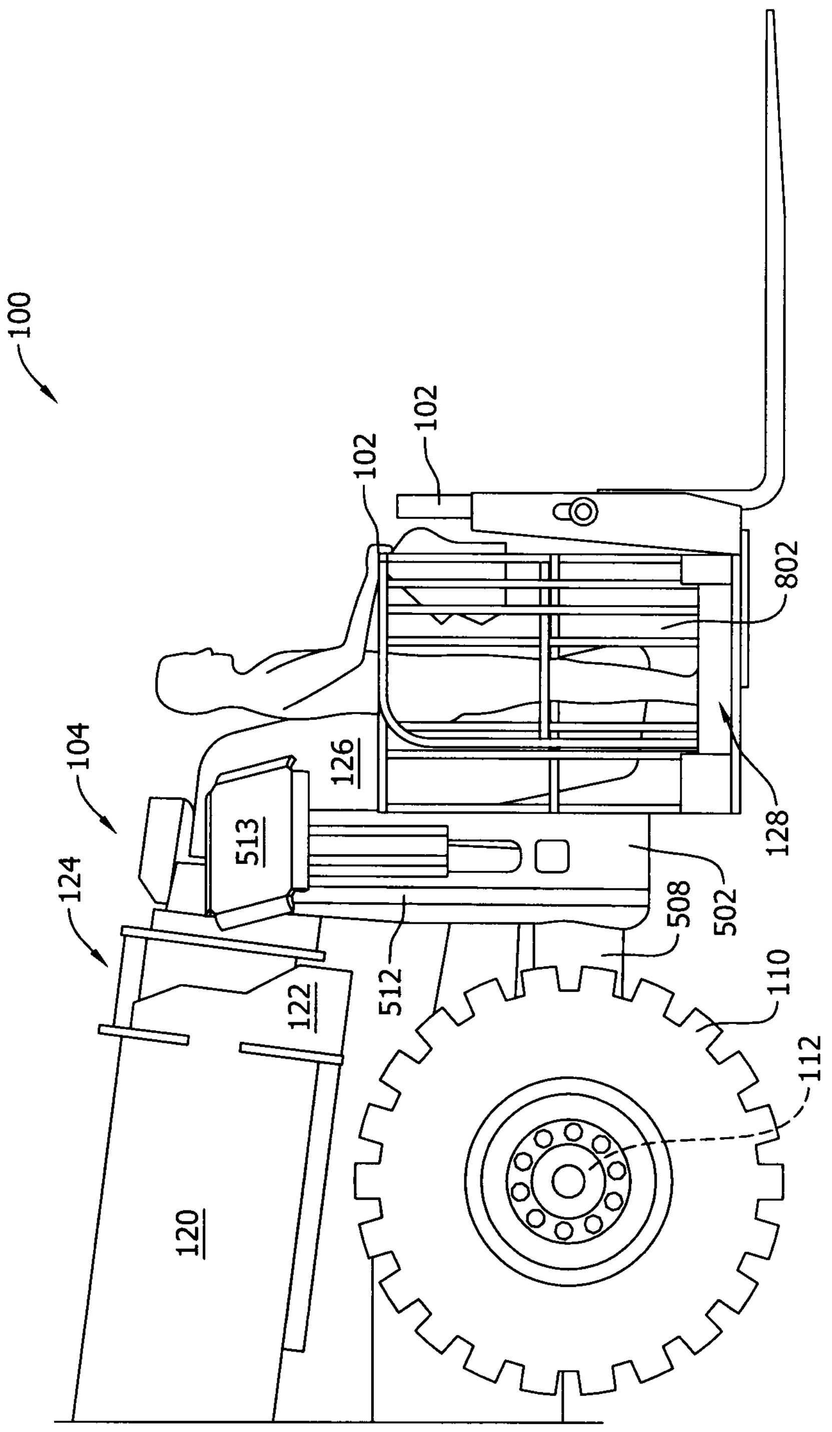
FIG. 7 is a side elevation view of one of a plurality of material implements available for the construction machine shown in FIG. 1.

FIG. 7 is a side elevation view of one of a plurality of material implements 130 available for construction machine 100. In the example embodiment, jib section 126 includes a material implement handler 802 configured to couple to any of a type of various material implements 130. In the example embodiment, forklift tines 132 are available to the operator. In other embodiments, material implement 130 may be embodied in a drywall fork, a round hay bale spear, a jib winch, a glass vacuum grab device, and the like.

Figure 8:
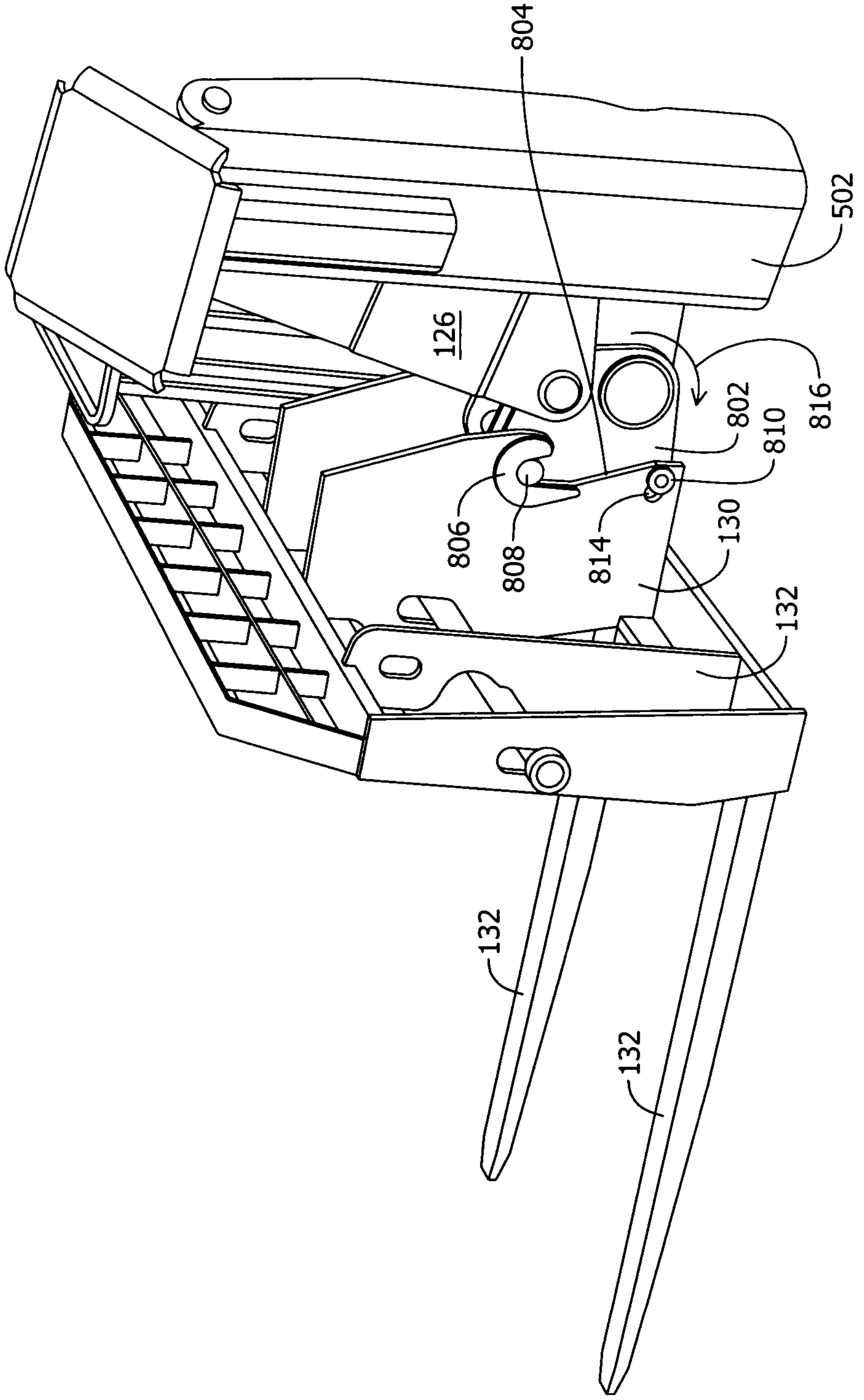
FIG. 8 is a perspective view of a material implement handler.

FIG. 8 is a perspective view of material implement handler 802. Material implement 130 includes an engagement surface 804 that receives a portion of material implement handler 802 and an engagement hook 806 that locks material implement 130 onto material implement handler 802.

During installation of material implement 130, the operator drives construction machine 100 behind a selected one of the plurality of material implements 130. The operator causes material implement handler 802 to engage an engagement surface 804. Then by raising material implement handler 802, an engagement mechanism 808, such as, a large diameter pin slides up over engagement surface 804 until engagement occurs between engagement mechanism 808 and engagement hook 806. An auxiliary fastener 810 may be used to secure a lower portion 812 of material implement 130 to material implement handler 802 using a slot 814. The orientation of engagement hook 806 with respect to slot 814 may require material implement handler 802 to be rotated in, for example, a clockwise direction 816.

Figure 9:
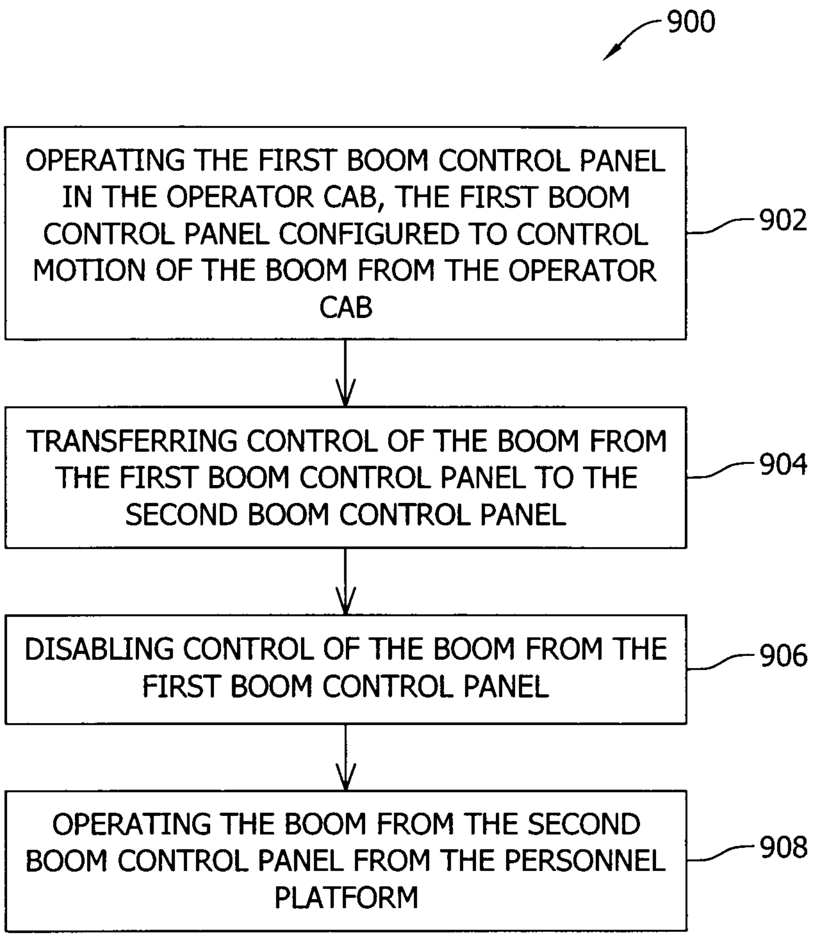
FIG. 9 is a flowchart of a method of operating the construction machine shown in FIG. 1.

FIG. 9 is a flowchart of a method 900 of operating the construction machine shown in FIG. 1. The construction machine includes a boom having a material implement and personnel platform coupled to a distal end of the boom and an operator cab having a first boom control panel. The personnel platform includes a second boom control panel. Method 900 includes operating 902 the first boom control panel in the operator cab wherein, the first boom control panel is configured to control motion of the boom from the operator cab. Method 900 also includes transferring 904 control of the boom from the first boom control panel to the second boom control panel and disabling 906 control of the boom by the first boom control panel. Method 900 further includes operating 908 the boom from the second boom control panel from the personnel platform.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A telehandler vehicle comprising:

a self-propelled chassis comprising:

a frame supporting an operator cab, the operator cab including a first boom control panel; and a propulsion system configured to control a movement and a position of said frame;

a boom pivotably coupled to said frame;

a material handling implement coupled to a distal end of said boom;

a personnel platform coupled to the distal end of said boom, said personnel platform having a forward end in a direction of travel and an aft end opposite said forward end; and a second boom control panel coupled to the forward end of said personnel platform;

wherein each of said first boom control panel and said second boom control panel is independently operable to control said boom and said first boom control panel is operable to control said propulsion system;

wherein said first boom control panel and said second boom control panel are interlocked, said first boom control panel comprising a lockout switch operable to selectively transfer complete control of said boom between said first and second boom control panels such that said first boom control panel is prevented from operating said boom and operating said propulsion system when said second boom control panel is active and such that said second boom control panel is prevented from operating said boom when said first boom control panel is active.

2. The telehandler vehicle of claim 1, wherein said second boom control panel is configured to be operated by an operator manning said personnel platform.

3. The telehandler vehicle of claim 1, wherein said second boom control panel is oriented for manual operation when an operator is facing in the direction of travel.

4. The telehandler vehicle of claim 1, further comprising a plurality of outriggers, each outrigger comprising a brace coupled to said frame and an axle of said telehandler vehicle and a lower arm coupled to said brace through an elbow joint.

5. The telehandler vehicle of claim 4, wherein the elbow joints are fixed.

6. The telehandler vehicle of claim 4, wherein the elbow joints are pivotable in one degree of motion.

7. The telehandler vehicle of claim 4, wherein said second boom control panel is operable to deploy and retract said plurality of outriggers individually or simultaneously.

8. The telehandler vehicle of claim 1, further comprising a second boom control panel support, said second boom control panel is removably coupled to said second boom control panel support.

9. A telehandler vehicle comprising:

a chassis comprising a forward end, an aft end opposite said forward end, a frame extending therebetween, and at least one powered drive wheel;

an operator cab mounted on said chassis;

a boom assembly having at least one boom section pivotally coupled to said chassis;

a material handling implement couplable to a distal end of said at least one boom section;

a personnel platform mounted adjacent said material handling implement;

a first boom control panel positioned in said operator cab and comprising a first plurality of manual input devices responsive to an operator manning said operator cab for receiving boom motion commands for causing the boom assembly to move in a desired direction and chassis motion commands for causing the telehandler vehicle to move in a desired direction;

a second boom control panel positioned on said personnel platform comprising a second plurality of manual input devices responsive to an operator manning said personnel platform for receiving boom motion commands for causing the boom assembly to move in a desired direction, wherein manual input devices for receiving the chassis motion commands are absent from the second plurality of manual input devices on the second boom control panel; and a lockout circuit interconnecting the first boom control panel and the second boom control panel, the lockout circuit comprising a lockout switch operable to selectively transfer complete control of the telehandler vehicle between the first and second boom control panels to prevent the boom motion commands received by the first boom control panel from causing the boom assembly to move and the chassis motion commands received by the first boom control panel from causing the chassis to move when the second boom control panel is active and to prevent the boom motion commands received by the second boom control panel from causing the boom assembly to move when the first boom control panel is active.

10. The telehandler vehicle of claim 9, wherein said chassis further comprises a hydraulic system for moving the at least one boom section.

11. The telehandler vehicle of claim 9, further comprising a plurality of outriggers, each outrigger comprising an upper arm and a lower arm coupled together through an elbow joint, wherein said second plurality of manual input devices on said second boom control panel comprise manual input devices operable to deploy and retract said plurality of outriggers individually or simultaneously.

12. The telehandler vehicle of claim 11, wherein the elbow joints are at least one of fixed and pivotable in one degree of motion.

13. The telehandler vehicle of claim 9, wherein at least one of said first and second boom control panels comprise a screen input device and wherein said first and second plurality of manual input devices comprise soft keys on the screen input device.

14. A method of operating a construction machine that includes an operator cab having a first boom control panel and a boom having a material implement and personnel platform coupled to a distal end of the boom, the personnel platform including a second boom control panel, said method comprising:

operating the first boom control panel in the operator cab, the first boom control panel configured to control motion of the boom from the operator cab;

transferring control of the boom from the first boom control panel to the second boom control panel;

disabling control of the boom from the first boom control panel when control of the boom is transferred to the second boom control panel; and operating the boom from the second boom control panel from the personnel platform, wherein transferring control of the boom comprises providing an interlock that prevents operation of the boom during operation of propulsion and steering of the construction machine and that prevents operation of propulsion and steering of the construction machine during operation of the boom.

15. The method of operating a construction machine of claim 14, wherein operating the boom from the second boom control panel comprises operating the boom from the second boom control panel with the operator cab unattended.

16. The method of operating a construction machine of claim 14, wherein positioning a second boom control panel comprises positioning the second boom control panel in the personnel platform mounted to at least one of a handrail and a stanchion.

17. The method of operating a construction machine of claim 14, wherein the construction machine includes a plurality of outriggers, each of the plurality of outriggers extending forward of each forward wheel of the construction machine and aft of each after wheel of the construction machine, said method further comprising deploying each outrigger individually or ganged with other outriggers from the second boom control panel in the personnel platform.

* * * * *